(12) United States Patent
Jones

(10) Patent No.: US 8,813,503 B2
(45) Date of Patent: Aug. 26, 2014

(54) GAS TURBINE CONTROL SYSTEMS AND METHODS

(75) Inventor: Douglas Alan Jones, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 13/523,857

(22) Filed: Jun. 14, 2012

(65) Prior Publication Data

US 2013/0333393 A1 Dec. 19, 2013

(51) Int. Cl.
*F02K 1/00* (2006.01)

(52) U.S. Cl.
USPC ............................................. 60/772; 60/728

(58) Field of Classification Search
CPC ............... F02C 7/143; F05D 2260/211; F05D 2270/313; Y02E 20/16; Y02E 20/18
USPC .................................... 60/728, 772
See application file for complete search history.

(56) References Cited

U.S. PATENT DOCUMENTS

| | | | | |
|---|---|---|---|---|
| 2,678,531 | A * | 5/1954 | Miller | 60/775 |
| 3,831,373 | A * | 8/1974 | Flynt | 60/802 |
| 4,592,204 | A | 6/1986 | Rice | |
| 5,193,352 | A | 3/1993 | Smith et al. | |
| 5,444,971 | A * | 8/1995 | Holenberger | 60/783 |
| 5,669,217 | A | 9/1997 | Anderson | |
| 5,758,485 | A | 6/1998 | Frutschi | |
| 6,412,291 | B1 | 7/2002 | Erickson | |
| 6,430,931 | B1 | 8/2002 | Horner | |
| 6,470,686 | B2 | 10/2002 | Pierson | |
| 7,065,953 | B1 | 6/2006 | Kopko | |
| 2004/0244380 | A1 * | 12/2004 | Stegmaier et al. | 60/772 |
| 2008/0178590 | A1 | 7/2008 | Chillar et al. | |
| 2013/0186117 | A1 * | 7/2013 | Desai | 62/94 |
| 2014/0027097 | A1 | 1/2014 | De Barros et al. | |

FOREIGN PATENT DOCUMENTS

| | | |
|---|---|---|
| EP | 1484489 A2 | 12/2004 |
| GB | 1025538 A | 4/1966 |
| WO | 0008327 A2 | 2/2000 |
| WO | 2004009979 A1 | 1/2004 |

OTHER PUBLICATIONS

Search Report and Written Opinion from corresponding PCT Application No. PCT/US2013/040885 dated Sep. 17, 2013.

* cited by examiner

*Primary Examiner* — Phutthiwat Wongwian
(74) *Attorney, Agent, or Firm* — Fletcher Yoder P.C.

(57) ABSTRACT

Methods and systems for controlling a gas turbine system are provided herein. In one embodiment, a method includes the steps of receiving at least one parameter of turbine inlet air and determining, based on the at least one parameter, an expected condensation level at an intercooler disposed downstream of an inlet air chilling system and in-line between a low pressure compressor and a high pressure compressor. The method further includes determining a desired temperature of the turbine inlet air corresponding to substantially no expected condensation at the intercooler and controlling the inlet air chilling system to chill the turbine inlet air to the desired temperature.

20 Claims, 3 Drawing Sheets

GAS TURBINE CONTROL SYSTEMS AND METHODS

BACKGROUND OF THE INVENTION

The subject matter disclosed herein relates to gas turbine inlet chilling systems and methods for use, for example, in power generation systems.

Many applications, such as power plants, utilize gas turbines to generate power and/or drive a load. Accordingly, the gas turbine typically includes a variety of components that cooperatively operate to produce the generated power. For example, certain gas turbines include one or more compressors that are utilized in one or more stages of compression to reduce the volume and increase the pressure of the gas flowing therethrough. Use of such compressors may lead to the generation of heat byproducts that may reduce the efficiency of the overall power production process. Accordingly, some gas turbine systems have been modified to include one or more intercoolers that are operated between the stages of compression, thus increasing the power and efficiency of the overall process.

In certain systems, the intercooler may be located external to the gas turbine system, and, accordingly, the gas may be routed from the first stage of compression, through an external heat exchanger, and back into the gas turbine system before entering the next stage of compression. Unfortunately, such a configuration may lead to power losses that result from directing the high velocity gas from the gas turbine and through the external heat exchanger. In an attempt to overcome this drawback, certain systems have included an intercooler in line with the compressors within the gas turbine system. However, this configuration may be associated with a variety of drawbacks, such as the generation of condensation in the high velocity gas flow path, which may affect downstream components of the power generation system. Accordingly, there exists a need for improved gas turbine systems that address one or more of these drawbacks.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes a gas turbine having an inlet adapted to receive inlet air and being adapted to combust a fuel to generate power. The gas turbine includes a chilling assembly adapted to reduce the temperature of the inlet air to produce chilled air, a low pressure compressor adapted to compress the chilled air to produce a first compressed air supply, and an intercooler adapted to cool the first compressed air supply to produce a cooled air supply. The gas turbine also includes a high pressure compressor adapted to compress the cooled air supply to produce a second compressed air supply. The intercooler is disposed in-line between the low pressure compressor and the high pressure compressor. Further, the gas turbine includes a combustor adapted to combust the fuel in the presence of the second compressed air supply to generate the power. The gas turbine system also includes a control system adapted to determine a first expected condensation level at the intercooler and to control operation of the chilling assembly to produce the chilled air at a temperature corresponding to a second expected condensation level reduced from the first expected condensation level.

In a second embodiment, a system includes a gas turbine system including a chilling system adapted to cool inlet air, a low pressure compressor, a high pressure compressor, and an intercooler disposed in-line between the low pressure compressor and the high pressure compressor and adapted to cool air compressed from the low pressure compressor. The system also includes a control system coupled to the chilling system and adapted to determine an expected condensation level at the intercooler based on one or more parameters of the inlet air and to control the chilling system to reduce the humidity ratio of the inlet air to a temperature consistent with a reduction in the expected condensation level at the intercooler.

In a third embodiment, a method includes the steps of receiving at least one parameter of turbine inlet air and determining, based on the at least one parameter, an expected condensation level at an intercooler disposed downstream of an inlet air chilling system and in-line between a low pressure compressor and a high pressure compressor. The method further includes determining a desired temperature of the turbine inlet air corresponding to substantially no expected condensation at the intercooler and controlling the inlet air chilling system to chill the turbine inlet air to the desired temperature.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described in more detail below, provided herein are systems and methods for gas turbines that enable the temperature of gas turbine inlet air to be controlled such that a reduction or elimination of condensation formed in a downstream in-line intercooler may be realized. For example, in some embodiments, a controller may determine the condensation point of the inlet air and regulate the amount of cooling provided by the inlet cooling system such that the inlet air is cooled below the condensation point, thereby reducing or eliminating the possibility of moisture occurring in the in-line intercooler positioned between the downstream stages of compression. That is, in certain embodiments, operation of the inlet cooling system may be controlled to regulate the temperature of the fluid flowing through the gas turbine system to increase the efficiency of system including an in-line intercooler. To that end, certain embodiments may include instrumentation, such as sensors systems including, for example, temperature and humidity sensors, coupled to the controller and capable of providing relevant parameters to the controller for use in one or more control algorithms.

Figure 1:
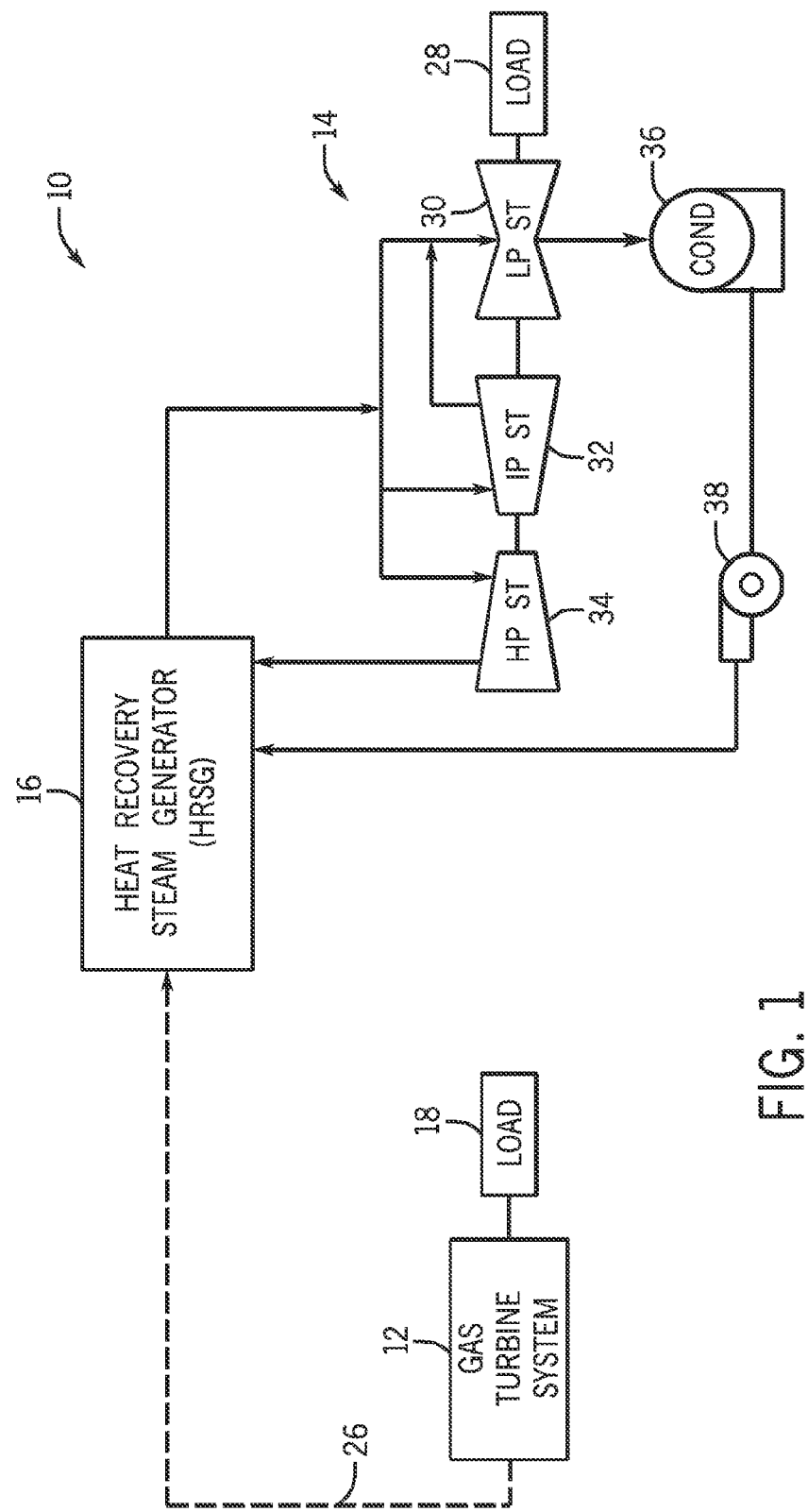
FIG. 1 is a schematic flow diagram of an embodiment of a combined cycle power generation system including a gas turbine system.

Turning now to the drawings, FIG. 1 is a schematic flow diagram of an embodiment of a combined cycle power generation system 10 that may include a gas turbine system 12 having a control system that controls an inlet chilling system and an in-line intercooler to reduce or eliminate condensation formation within the gas turbine system 12, as described in more detail below. In the embodiment of FIG. 1, the gas turbine system 12 is illustrated as part of the combined cycle power generation system 10. However, it should be noted that in other embodiments, the gas turbine system 12 may be included as part of any suitable system that utilizes a gas turbine system, or may be provided independent of other components. Indeed, the embodiment of FIG. 1 is merely illustrative of one possible system within which the gas turbine system 12 may be located. For example, the provided gas turbine systems may be utilized in simple cycle power generation systems, or may be utilized in systems that are independent of power generation. For instance, the gas turbine systems provided herein may be utilized in compressor drive systems, or any other type of system that utilizes a gas turbine system.

Turning now to the system 10 depicted in FIG. 1, the system 10 includes the gas turbine 12, a steam turbine 14, and a heat recovery steam generation (HRSG) system 16. Within the gas turbine 12, gas, such as syngas, may be combusted to generate power within a "topping," or Brayton, cycle. Exhaust gas from the gas turbine 12 may be supplied to the HRSG system 16 to generate steam within a "bottoming," or Rankine, cycle. In certain embodiments, the gas turbine 12, the steam turbine 14, and the HRSG system 16 may be included within an integrated gasification combined cycle (IGCC) power plant.

The gas turbine 12 may generally combust a fuel (e.g., liquid and/or gas fuel) to drive a first load 18. The first load 18 may, for instance, be an electrical generator for producing electrical power. To that end, the gas turbine 12 may include components such as a turbine, a combustor or combustion chamber, a compressor, one or more heat exchangers, and so forth, as discussed in more detail below. For further example, in one embodiment, the gas turbine 12 may include an in-line intercooler disposed between compressors for intercooling of the air between stages of compression. The temperature of the inlet air entering such a gas turbine system 12 may be reduced such that condensation at the in-line intercooler is reduced or eliminated, as discussed in more detail below.

Exhaust gas 26 from the gas turbine 12 may be used to generate steam supplied to the steam turbine 14, for example, through the HRSG system 16, for driving a second load 28. The second load 28 also may be an electrical generator for generating electrical power. However, both the first and second loads 18 and 28 may be other types of loads capable of being driven by the gas turbine 12 and steam turbine 14. Further, although the gas turbine 12 and steam turbine 14 are depicted as driving separate loads 18 and 28, the gas turbine 12 and steam turbine 14 also may be utilized in tandem to drive a single load via a single shaft. In the depicted embodiment, the steam turbine 14 may include a low-pressure section 30 (LP ST), an intermediate-pressure section 32 (IP ST), and a high-pressure section 34 (HP ST). However, the specific configuration of the steam turbine 14, as well as the gas turbine 12, may be implementation-specific and may include any combination of sections.

The system 10 also includes the HRSG system 16, which employs heat from the gas turbine 12 to generate steam for the steam turbine 14. The HRSG system 16 may include components such as evaporators, economizers, heaters, superheaters, and attemperators, among others, that are used to generate a high-pressure, high-temperature steam. For example, the HRSG system 16 may include an ammonia injection system designed to inject ammonia into the exhaust gas 26 to facilitate the reduction of $NO_x$ within the exhaust gas 26. In certain embodiments, the ammonia injection system may inject ammonia into the exhaust gas 26 upstream of a catalyst bed where the $NO_x$ contained in the exhaust gas 26 is selectively reduced via reaction with ammonia in the presence of oxygen to produce nitrogen and water.

The steam produced by the HRSG system 16 may be supplied to the low-pressure section 30, the intermediate pressure section 32, and the high-pressure section 34 of the steam turbine 14 for power generation. Exhaust from the low-pressure section 30 may be directed into a condenser 36. Condensate from the condenser 36 may, in turn, be returned to the HRSG system 16 with the aid of a condensate pump 38. Within the HRSG system 16, the condensate may then be reheated to generate steam for the steam turbine 14.

Here again, it should be noted that although the gas turbine system 12 is illustrated as part of the combined cycle power generation system 10 of FIG. 1, in other embodiments, the gas turbine system 12 may be included as part of any suitable system that utilizes a gas turbine system, or may be provided independent of other components. The foregoing description of the embodiment of FIG. 1 is merely an example of one possible system within which the gas turbine system 12 may be located.

Figure 2:
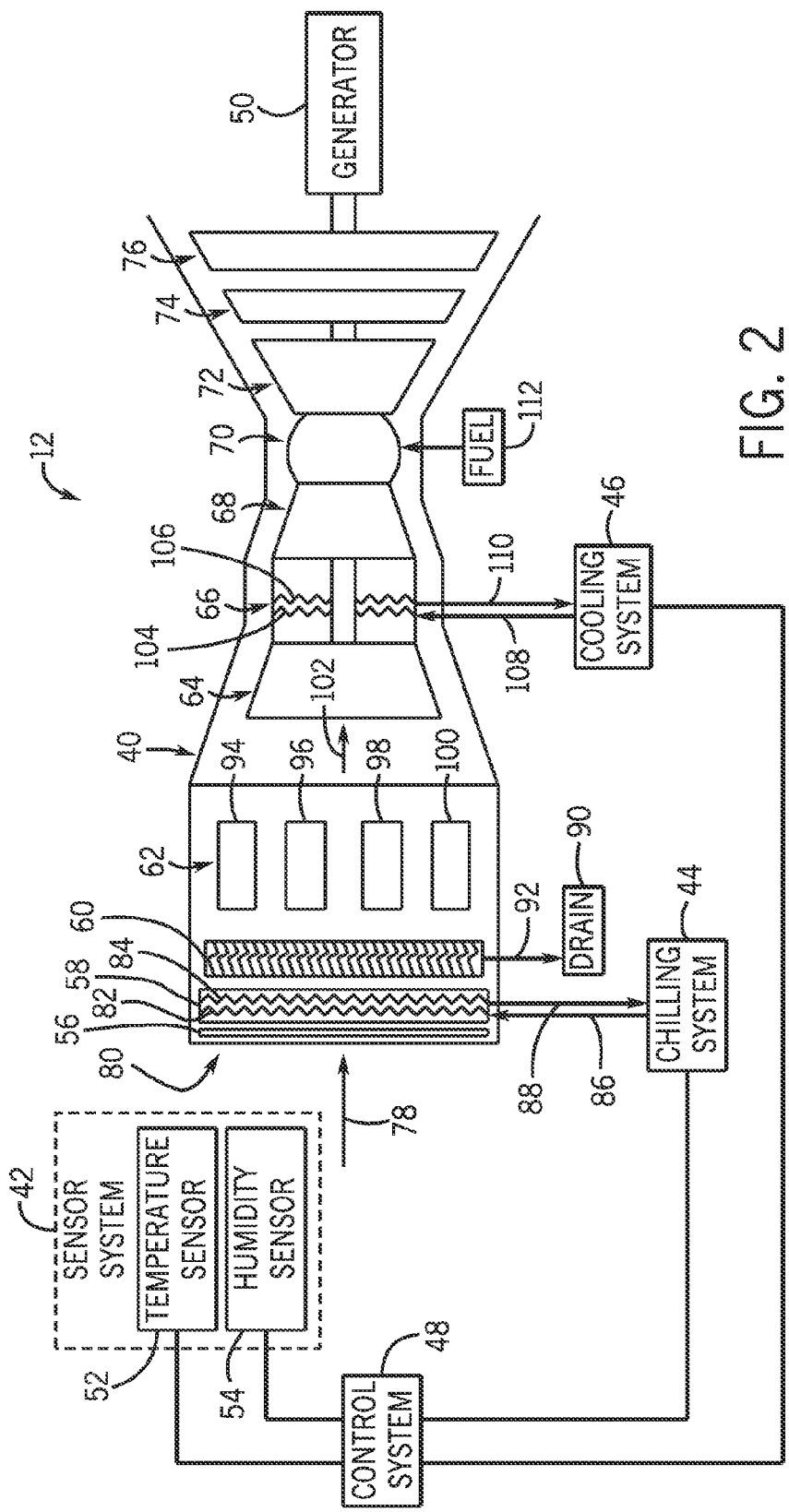
FIG. 2 is a schematic diagram of an embodiment of the gas turbine system of FIG. 1.

Turning now to features of embodiments of the gas turbine system, FIG. 2 is a schematic diagram of an embodiment of the gas turbine system 12 shown in FIG. 1. As shown, the gas turbine system 12 includes a gas turbine 40, a sensor system 42, a chilling system 44, and a cooling system 46. A control system 48 coordinates control and operation of the turbine 40 and the systems 42, 44, and 46 to drive a generator 50. The illustrated sensor system 42 includes a temperature sensor 52 and a humidity sensor 54. The gas turbine 40 includes an inlet filter assembly 56, an inlet chilling coil assembly 58, a moisture separator 60, a filter assembly 62, a low pressure compressor 64, an in-line intercooler 66, a high pressure compressor 68, a combustor 70, a high pressure turbine 72, an intermediate pressure turbine 74, and a power turbine 76.

During operation, inlet air 78 enters the gas turbine 40 and is utilized in the combustion process to generate power to drive the generator 50. The control system 48 coordinates operation of the sensor system 42, the chilling system 44, and the cooling system 46 to optimize the power generation process. For example, in one embodiment, the control system 48 may control the chilling system 44 to reduce the temperature of the inlet air 78 to establish the dew point of the inlet air 78 at a reduced level sufficient to reduce or eliminate the likelihood that condensation will occur at the downstream in-line intercooler 66. That is, because condensation is likely to occur at the in-line intercooler 66 if the intercooler 66 cools the air below the dew point, the likelihood of condensation occurring at the intercooler 66 may be reduced by cooling the inlet air 78 below the dew point. Accordingly, in some embodiments, the control system 48 may indirectly reduce the possibility of condensation occurring at the in-line intercooler 66 by directly controlling the chilling system 44.

The control system 48 is capable of receiving a variety of operational and sensed parameters that correspond to the operation of the gas turbine system 12 and/or to relevant environmental conditions. For example, the control system 48 is coupled to the sensor system 42, which outputs sensed parameters to the control system 48. In the illustrated embodiment, the sensor system 42 communicates the temperature of the surrounding air, as sensed by temperature sensor 52, and the humidity of the surrounding air, as sensed by humidity sensor 54, to the control system 48. The control system 48 may utilize these inputs either alone or in combination with other received information to determine a desired temperature of the inlet air 102 such that condensation is unlikely to form at the downstream intercooler 66. It should be noted that the sensor system 42 may be controlled to measure the desired parameters before operation of the gas turbine system has begun, throughout operation of the system, or both, depending on a variety of implementation-specific factors.

For example, in certain embodiments, the temperature or humidity of the environment in which the gas turbine 40 is being operated may partially or entirely determine the control algorithm implemented by the control system 48. That is, the control system 48 may be configured to optimize the performance of the gas turbine 40 by taking into account both the reduction or elimination of condensation at the in-line intercooler 66 as well as the operational performance of the other components of the system. For instance, in a low humidity environment (or on a low humidity day), the operation of the chilling system 44 may depend more heavily on the operational needs of, for example, the low pressure compressor 64 and less heavily on the operation of the intercooler 66. However, in high humidity environments (or on high humidity days), condensation at the intercooler 66 may be more likely to affect the overall system performance, and the control system 48 may determine operation of the chilling system 44 with a high priority given to condensation reduction.

During operation of the gas turbine 40, the inlet air 78 enters the gas turbine 40 via an inlet portion 80 of the turbine 40 and is filtered by the inlet filter assembly 56 to remove particulates. The air is then directed through the inlet chilling assembly 58 that operates to reduce the temperature of the inlet air 78. The illustrated inlet chilling assembly 58 includes chilling coils 82 and 84 through which a suitable coolant is routed, and as the inlet air 78 contacts the outer surfaces of the chilling coils 82 and 84, heat from the inlet air 78 is transferred to the coolant flowing through the chilling coils 82 and 84. Accordingly, the temperature of the inlet air is reduced, and the temperature of the coolant is increased. As shown, a chilled coolant 86 is generated by the chilling system 44 at the temperature dictated by the control system 48 and circulated through the coil 82. After heat exchange with the inlet air 78, a heated coolant 88 is returned to the chilling system 44. Here again, it should be noted that the temperature of the chilled coolant 86 may be regulated such that the chilled air exiting the chilling assembly 58 is maintained at a temperature sufficient to reduce or eliminate condensation at the downstream intercooler 66.

As the air is cooled by the inlet chilling assembly 58, water is condensed out of the air, and the moisture separator 60 separates this water from the air. The water is removed from the gas turbine 40 and is collected by a drain 90, as indicated by arrow 92. A plurality of filters 94, 96, 98, and 100 in the filter assembly 62 then filter the chilled air before the air is directed toward the stages of compression, as indicated by arrow 102.

The chilled air then passes through the low pressure compressor 64. The low pressure compressor 64 reduces the volume of the chilled air 102 to increase the pressure of the chilled air to an intermediate pressure (e.g., approximately 50 psia), thereby producing pressurized air. The pressured air is then directed to the in-line intercooler 66 to cool the pressurized air between stages of compression to reduce the power requirements necessary for the stages of compression. To that end, as shown, the intercooler 66 includes heat exchanger coils 104 and 106, through which a coolant flows. The cooling system 46 provides a cooled coolant 108 to the coil 104 and receives a heated coolant 110 from the coil 106 after heat has been exchanged from the pressurized air to the coolant circulating through the coils 104 and 106. It should be noted, however, that any suitable intercooler including heat exchangers of any desired type (e.g., finned heat exchangers) may be utilized in placed of the illustrated arrangement.

It should be noted that by providing cooling in-line with the compressors 64 and 68, as opposed to providing cooling out of line with the flow through the turbine 40, the efficiency of the compression process and, thus, the efficiency of the operation of the gas turbine 40, may be increased. That is, because the air need not be directed away from the compressors 64 and 68, losses associated with such a redirection may be avoided. Again, it should be noted that by controlling the chilling system 44 to provide the predetermined amount of cooling of the inlet air 78, the control system 48 may reduce or eliminate the likelihood of condensation occurring at the in-line intercooler 66.

The cooled and compressed air then passes into the high pressure compressor 68, where the air is further compressed to a higher pressure (e.g., approximately 600 psia). The pressurized air from the high pressure compressor 68 then enters the combustor 70. In the combustor 70, fuel 112 is added to the pressurized air and burned to increase the temperature, thereby producing a hot gas. The hot gas that is produced in the compressor 70 is directed to the high pressure turbine 72, which produces the power necessary to drive the high pressure compressor 68. The hot gas leaving the high pressure turbine 72 enters the intermediate pressure turbine 74, which produces the power necessary to drive the low pressure compressor 64. Subsequently, the hot gas passes through the power turbine 76, which drives the generator 50. Accordingly, in this manner, the gas turbine system 12 may be operated to produce electricity from the inlet air 78 and the fuel 112.

Figure 3:
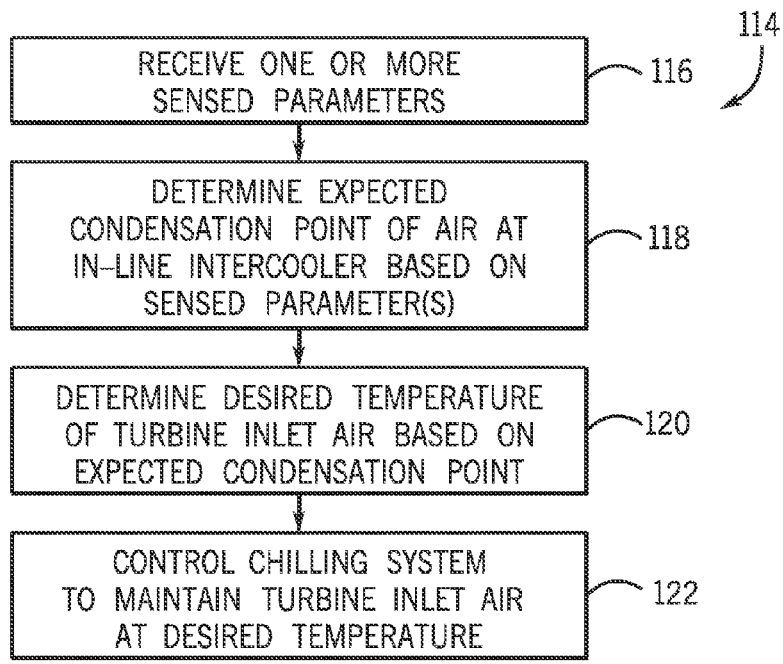
FIG. 3 illustrates a method that may be employed to operate the gas turbine system of FIG. 2 to regulate the turbine inlet air temperature in accordance with an embodiment of the present disclosure.

FIG. 3 illustrates a method 114 that may be employed, for example, by a controller located in the control system 48 in order to reduce or eliminate condensation formation at an in-line intercooler in a gas turbine system in accordance with an embodiment. As shown, the method 114 includes the step of receiving one or more sensed (or otherwise acquired)

parameters (block 116). For example, the controller may receive the sensed temperature of the environment, sensed humidity of the environment, operational parameters of the gas turbine, or any other suitable parameter relevant to control of the gas turbine system.

The method 114 further calls for utilizing the received parameters for determining the expected condensation point of the turbine inlet air once it reaches the downstream intercooler located between compression stages (block 118). The controller may then utilize the expected condensation point of the air at the given environmental and operational conditions to determine a temperature at which the turbine inlet air should be established in order to reduce or eliminate the likelihood of condensation occurring at the downstream intercooler (block 120). Once the desired temperature has been determined, the method 114 calls for controlling the chilling system to maintain the turbine inlet air at the desired temperature (block 122).

For example, in one embodiment, the control system may take into account the temperature of the incoming air, the desired temperature of the turbine inlet air, and the rate of heat transfer from the heat exchangers in the chilling system to the inlet air to determine the appropriate temperature of the coolant circulated through the heat exchangers. The chilling system may then be controlled to chill the coolant to the temperature necessary to achieve the desired cooling of the inlet air in the given conditions. By incorporating the expected condensation point of the air into the control of the gas turbine system, the likelihood of condensation occurring at the in-line intercooler may be reduced as compared to traditional systems that may base control of the chilling system solely on the operation of, for example, the downstream compressors.

Figure 4:
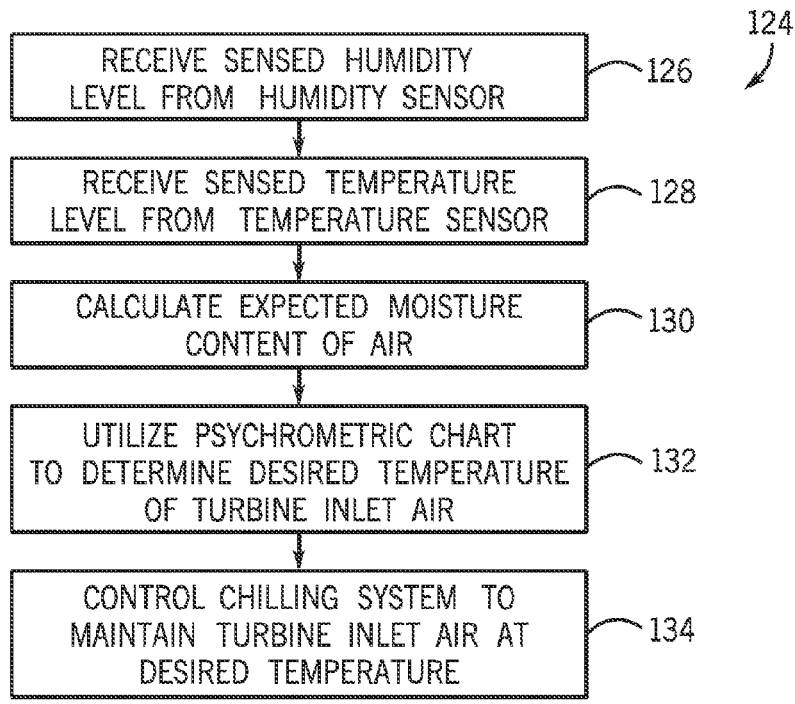
FIG. 4 illustrates another method that may be employed to operate the gas turbine system of FIG. 2 to regulate the turbine inlet air temperature in accordance with an embodiment of the present disclosure.

It should be noted that the determination of the desired temperature of the turbine inlet air may be determined in any suitable manner based on the received or sensed parameters. However, FIG. 4 illustrates an embodiment of one suitable method 124 for making such a determination and utilizing the determination to drive operation of the chilling system. More specifically, the method 124 includes receiving a sensed humidity level from the humidity sensor (block 126) and receiving a sensed temperature level from the temperature sensor (block 128). Based on these sensed parameters, the controller calculates the expected moisture content of the air (block 130), which may be an indicator of the amount of condensation that would be expected to condense out of the air during its use in the gas turbine system.

Further, the method 124 calls for utilizing a psychrometric chart to determine the expected amount of condensation that would occur at the downstream intercooler if the air was not cooled and utilizing this amount of condensation to determine the temperature at which the turbine inlet air should be established to reduce or eliminate the likelihood of such condensation occurring (block 132). As before, the operation of the chilling system may then be controlled to maintain the turbine inlet air at the appropriate temperature (block 134).

It should be noted that embodiments of the disclosed gas turbine systems are compatible for use in combined cycle power plant components, such as those illustrated herein, as well as for use in simple cycle applications. The disclosed gas turbine systems are also compatible with use in non-power generation systems. Such gas turbine systems may be utilized, for example, in compressor drive systems, or any other system that employs a gas turbine.

Further, the depicted components of the gas turbine system are merely examples, and, accordingly, during implementation, the components included in the gas turbine system are subject to considerable variations. For example, in certain embodiments, the control system may include a variety of suitable components, such as a processor, memory, and so forth. Further, it should be noted that the control methods provided herein may be utilized to retrofit existing gas turbine systems having in-line intercoolers and moisture removal systems suitable for removing condensation from the inlet air. As such, it is envisioned that existing gas turbine system may be updated with the chilling and control systems provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
a gas turbine comprising an inlet configured to receive inlet air and being configured to combust a fuel to generate power, wherein the gas turbine comprises:
a chilling assembly configured to reduce the temperature of the inlet air to produce chilled air at or upstream of the inlet;
a low pressure compressor configured to compress the chilled air to produce a first compressed air supply;
an intercooler configured to cool the first compressed air supply to produce a cooled air supply;
a high pressure compressor configured to compress the cooled air supply to produce a second compressed air supply, wherein the intercooler is disposed in-line between the low pressure compressor and the high pressure compressor; and
a combustor configured to combust the fuel in the presence of the second compressed air supply to generate the power; and
a control system programmed to determine a first expected condensation level at the intercooler and to control operation of the chilling assembly to produce the chilled air at a temperature corresponding to a second expected condensation level reduced from the first expected condensation level.

2. The system of claim 1, wherein the second expected condensation level corresponds to approximately no condensation at the intercooler.

3. The system of claim 1, wherein the gas turbine comprises a moisture separator configured to drain moisture from the chilled air before the chilled air is compressed by the low pressure compressor.

4. The system of claim 1, wherein the gas turbine comprises a filter assembly disposed between the chilling assembly and the low pressure compressor and configured to remove particulates from the chilled air.

5. The system of claim 1, wherein the gas turbine comprises at least one turbine configured to drive a load.

6. The system of claim 5, wherein the load comprises an electrical generator.

7. The system of claim 1, comprising a sensor system comprising one or more sensors configured to measure one or more parameters of the inlet air and to communicate the measured parameters to the control system.

8. The system of claim 7, wherein the one or more sensors comprises a temperature sensor and a humidity sensor and the one or more parameters comprises a temperature level and a humidity level.

9. The system of claim 8, wherein the control system is configured to utilize the measured temperature and humidity levels and a pyschrometric chart to determine the first and second expected condensation levels.

10. A system, comprising: a gas turbine system comprising a chilling system configured to cool inlet air at or upstream of an inlet of the gas turbine system, a low pressure compressor, a high pressure compressor, and an intercooler disposed in-line between the low pressure compressor and the high pressure compressor and configured to cool air compressed from the low pressure compressor; and
a control system coupled to the chilling system and programmed to determine an expected condensation level at the intercooler based on one or more parameters of the inlet air and to control the chilling system to reduce the humidity ratio of the inlet air to a temperature consistent with a reduction in the expected condensation level at the intercooler.

11. The system of claim 10, wherein the control system is configured to reduce the humidity ratio of the inlet air to a temperature consistent with substantially no condensation at the intercooler.

12. The system of claim 10, comprising a sensor system comprising one or more sensors configured to measure the one or more parameters of the inlet air and to communicate the measured parameters to the control system.

13. The system of claim 12, wherein the one or more sensors comprises a temperature sensor and a humidity sensor and the one or more parameters of the inlet air comprises a temperature level and a humidity level.

14. The system of claim 13, wherein the control system is configured to utilize the measured temperature and humidity levels and a pyschrometric chart to determine the expected condensation level at the intercooler.

15. A method for controlling a gas turbine system, comprising:
receiving at least one parameter of turbine inlet air;
determining, based on the at least one parameter, an expected condensation level at an intercooler disposed downstream of an inlet air chilling system and in-line between a low pressure compressor and a high pressure compressor;
determining a desired temperature of the turbine inlet air corresponding to substantially no expected condensation at the intercooler; and
controlling the inlet air chilling system to chill the turbine inlet air to the desired temperature.

16. The method of claim 15, wherein the at least one parameter comprises a temperature level and a humidity level of the turbine inlet air.

17. The method of claim 16, wherein determining the desired temperature of the turbine inlet air corresponding to substantially no expected condensation at the intercooler comprises referencing a psychrometric chart.

18. The method of claim 15, wherein controlling the inlet air chilling system to chill the turbine inlet air to the desired temperature comprises controlling a temperature of a coolant circulating throughout heat exchangers of the inlet air chilling system.

19. The method of claim 15, comprising controlling a sensor system to measure the at least one parameter of the turbine inlet air throughout operation of the gas turbine system.

20. The method of claim 15, wherein the intercooler comprises a finned heat exchanger.

* * * * *